(12) United States Patent
Kawano

(10) Patent No.: US 7,877,634 B2
(45) Date of Patent: Jan. 25, 2011

(54) DATA COLLECTING APPARATUS AND GATEWAY APPARATUS

(75) Inventor: Seiichi Kawano, Tokyo (JP)

(73) Assignee: Mitsubishi Electric Corp., Tokyo (JP)

( * ) Notice: Subject to any disclaimer, the term of this patent is extended or adjusted under 35 U.S.C. 154(b) by 541 days.

(21) Appl. No.: 11/912,231

(22) PCT Filed: Apr. 20, 2005

(86) PCT No.: PCT/JP2005/007536

§ 371 (c)(1),
(2), (4) Date: Nov. 2, 2007

(87) PCT Pub. No.: WO2006/114871

PCT Pub. Date: Nov. 2, 2006

(65) Prior Publication Data

US 2009/0013220 A1   Jan. 8, 2009

(51) Int. Cl.
*G06F 11/00* (2006.01)
(52) U.S. Cl. .............................. 714/26; 714/25; 714/37
(58) Field of Classification Search .................. 714/25, 714/26, 37, 40, 47, 48
See application file for complete search history.

(56) References Cited

U.S. PATENT DOCUMENTS

| | | | | |
|---|---|---|---|---|
| 5,369,756 | A * | 11/1994 | Imura et al. ................. | 714/26 |
| 5,838,561 | A * | 11/1998 | Owen ........................ | 700/32 |
| 5,901,691 | A | 5/1999 | Katoh | |
| 6,182,249 | B1 * | 1/2001 | Wookey et al. ............. | 714/47 |
| 6,535,517 | B1 * | 3/2003 | Arkko et al. ............... | 370/401 |
| 6,684,247 | B1 * | 1/2004 | Santos et al. ............... | 709/224 |

(Continued)

FOREIGN PATENT DOCUMENTS

JP   62-274474 A   11/1987

(Continued)

OTHER PUBLICATIONS

Notification of Reasons for Refusal issued Dec. 15, 2009 in counterpart Japanese Application No. 2007-514382.

*Primary Examiner*—Joshua A Lohn
(74) *Attorney, Agent, or Firm*—Sughrue Mion, PLLC

(57) ABSTRACT

This invention intends to provide a data collecting apparatus and a gateway apparatus capable of reducing the labor for setting the threshold value or condition used for a real running point, reducing the number of cases where the threshold value or condition is erroneously set and setting the threshold value or condition within a narrow range.

The data collecting apparatus includes device value collecting unit 2 for collecting device values from a plurality of devices, abnormal state storage unit 3 for storing the monitored device to be monitored and the threshold value or condition by which it is determined that the monitored device is abnormal, abnormal state confirming unit 4 for comparing the device values of the plurality of devices with the threshold value or condition by which it is determined that the monitored device is abnormal, determining whether or not the device is abnormal and if abnormal, sending the information that the monitored device is abnormal to a host managing device, device feature information detecting unit for detecting the feature information from device value collected by the device value collecting unit 2 and abnormal state editing unit 8 for editing the threshold value or condition by which it is determined that the monitored device is abnormal, stored in the abnormal state storage unit 3, using the feature information detected.

7 Claims, 11 Drawing Sheets

U.S. PATENT DOCUMENTS

| | | | |
|---|---|---|---|
| 6,857,086 B2 * | 2/2005 | Shaw | 714/55 |
| 6,988,011 B2 * | 1/2006 | Varma et al. | 700/79 |
| 7,437,611 B2 * | 10/2008 | Agarwal et al. | 714/26 |
| 7,613,949 B1 * | 11/2009 | Boone et al. | 714/25 |
| 7,668,696 B2 * | 2/2010 | Gross et al. | 702/186 |
| 2001/0052087 A1 * | 12/2001 | Garg et al. | 714/37 |
| 2003/0097439 A1 * | 5/2003 | Strayer et al. | 709/224 |
| 2006/0143519 A1 * | 6/2006 | Maier et al. | 714/25 |

FOREIGN PATENT DOCUMENTS

| | | |
|---|---|---|
| JP | 5-189027 A | 7/1993 |
| JP | 6-274778 A | 9/1994 |
| JP | 6-309585 A | 11/1994 |
| JP | 7-282373 A | 10/1995 |
| JP | 10-54285 A | 2/1998 |
| JP | 2000-81912 A | 3/2000 |
| JP | 2003-233417 A | 8/2003 |
| JP | 2003-296851 A | 10/2003 |

* cited by examiner

| MAXIMUM | MINIMUM | NEWEST LOCAL MAXIMUM | LOCAL MAXIMUM INTERVAL | NEWEST LOCAL MINIMUM | LOCAL MINIMUM INTERVAL |
|---|---|---|---|---|---|
| 16(0:10:50) | 8(0:10:20) | 16(0:10:50) | 25 sec. | 9(0:10:35) | – (NOT CALCULATED YET) | though
DATA COLLECTING APPARATUS AND GATEWAY APPARATUS

TECHNICAL FIELD

This invention relates to a data collecting apparatus and a gateway apparatus for recording the data read from a plant and others through communication in order to collect the data on the plant and monitor the plant, and transferring the collected data and detected abnormality of the data to a host server using communicating means.

BACKGROUND ART

An example of the prior art is the technique disclosed in JP-A-5-189027 (Patent Reference 1).

The Patent Reference 1 discloses a technique in which in diagnosing signal abnormality, for a predetermined time interval (sampling period) in a normal running state of the signal to be diagnosed, the maximum width of a signal change or the maximum value of a signal changing rate is stored as that in the normal running sate and supplied with a margin to set for a threshold value of signal abnormality diagnosis, and the signal abnormality diagnosis is done on the basis of the threshold value.

Patent Reference 1: JP-A-5-189027

DISCLOSURE OF THE INVENTION

Problems that the Invention is to Solve

In the conventional data collecting apparatus, in diagnosing the signal abnormality, it is necessary to previously set the threshold value for identifying the abnormal state so that the threshold value cannot be set in accordance with the using situation of the state of the device to be monitored. This gave rise to overlooking of the abnormal state due to loose setting of the threshold value or erroneous recognition of regarding a normal state as the abnormal state due to strict setting of the threshold value.

Further, during the trial running for setting the threshold value, the abnormal state cannot be detected so that the threshold value cannot be used for a real running. This requires labor for computation and setting of the threshold value. Thus, disadvantageously, it takes a long time to boot the apparatus. Further, as the case may be, there are cases where overlooking of the abnormality during the trial running leads to erroneous setting of the threshold value and setting the threshold value in a wide range does not permit the initial step of abnormality of the device to be detected.

This invention has been accomplished in order to solve the problems described above. An object of this invention is to provide a data collecting apparatus and a gateway apparatus capable of reducing the labor for setting the threshold value or condition used for a real running point thereby to shorten the time taken to boot the apparatus, reducing the number of cases where the threshold value or condition is erroneously set and setting the threshold value or condition set within a narrow range.

Means for Solving the Problems

This invention includes device value collecting unit for collecting device values from a plurality of devices; abnormal state storage unit for storing a monitored device to be monitored and the threshold value or condition by which it is determined that the monitored device is abnormal; abnormal state confirming unit for comparing the device values of the plurality of devices with the threshold value or condition by which it is determined that the monitored device is abnormal, determining whether or not the monitored device is abnormal and if abnormal, sending the information that the monitored device is abnormal to a host managing device; device feature information detecting unit for detecting the feature information from device values collected by the device value collecting unit; and abnormal state editing unit for editing the threshold value or condition by which it is determined that the monitored device is abnormal, stored in the abnormal state storage unit, using the feature information detected.

Advantage of the Invention

This invention includes device value collecting unit for collecting the device values from a plurality of devices, abnormal state storage unit for storing a monitored device to be monitored and the threshold value or condition by which it is determined that the monitored device is abnormal, abnormal state confirming unit for comparing the device values of the plurality of devices with the threshold value or condition by which it is determined that the device is abnormal, determining whether or not the monitored device is abnormal and if abnormal, sending the information that the monitored device is abnormal to a host managing device, device feature information detecting unit for detecting the feature information from device values collected by the device value collecting unit and abnormal state editing unit for editing the threshold value or condition by which it is determined that the monitored device is abnormal, stored in the abnormal state storage unit, using the feature information detected. For this reason, the labor of setting the threshold value or condition used for the real running point can be reduced to shorten the time taken to boot the apparatus, the number of cases where the threshold value or condition is erroneously set can be reduced and the threshold value or condition set can be set within a narrow range.

Figure 1:
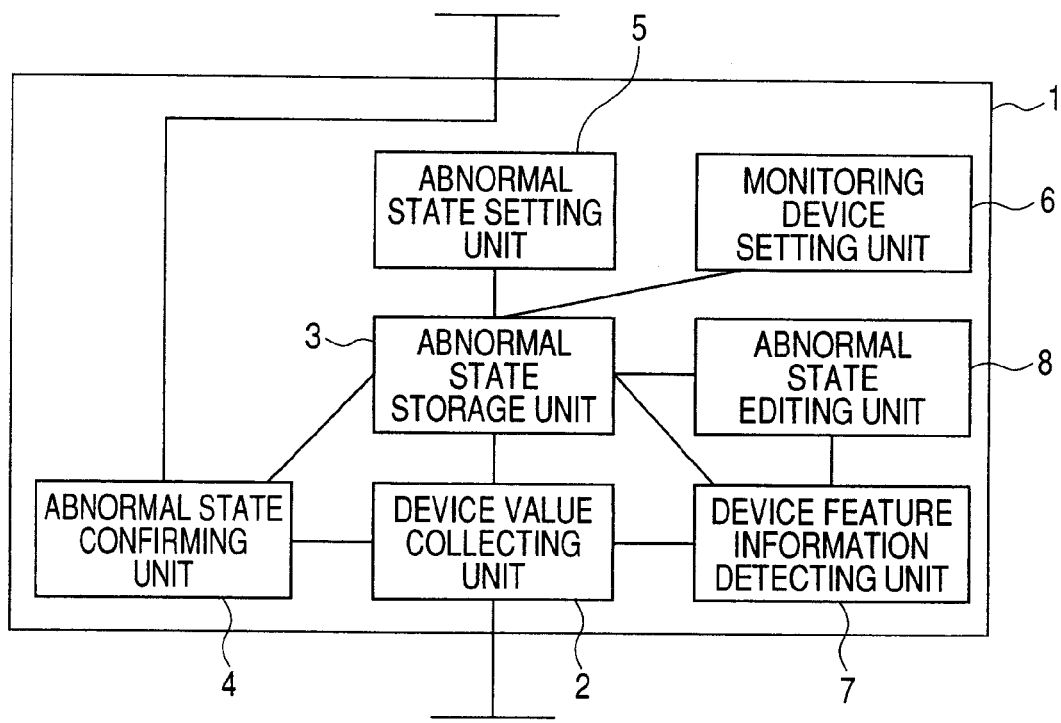
FIG. 1 is a block diagram of a data collecting apparatus according to the first embodiment of this invention.

DESCRIPTION OF REFERENCE NUMERALS AND SIGNS 1 data collecting apparatus, 2 device value collecting unit, 3 abnormal state storage unit, 4 abnormal state confirming unit, 5 abnormal state setting unit, 6 monitoring device setting unit, 7 device feature information detecting unit, and 8 abnormal state editing unit.

BEST MODE OF CARRYING OUT THE INVENTION

An explanation will be given of the best mode for carrying out this invention with reference to first to seventh embodiments.

FIG. 1 is a block diagram of a data collecting apparatus according to the first embodiment of this invention.

In FIG. 1, in a data collecting apparatus 1, the data of the device values of a programmable logic controller (hereinafter referred to as PLC), which is a device to be monitored, are collected and the device values are monitored. Concretely, the device values are read and recorded. In addition, if abnormality is detected as a result of monitoring changes in the device values, this fact is reported to a managing device such as a host computer.

An explanation will be given of the configuration.

The data collecting apparatus 1 is connected to a control network such as LAN. Device value collecting unit 2 within the data collecting apparatus 1 collects the device values of the PLC connected to the control network. The device value collecting unit 2 is communicatably connected to abnormal state storage unit 3 for storing the threshold value or condition by which the abnormal state of the PLC set for monitoring is decided, and connected to abnormal state confirming unit 4 for confirming whether or not the device value of the monitored PLC collected by the device value collecting unit 2 exceeds the threshold value stored in the abnormal state storage unit 3 or agrees with the condition stored therein. Further, the abnormal state storage unit 3 is communicatably connected to abnormal state confirming unit 4, abnormal state setting unit 5 for setting the threshold value or condition for deciding the abnormal state of the value of the PLC to be monitored, and monitored device setting unit 6 for specifying the monitored PLC to decide its abnormality.

Device feature information detecting unit 7 is communicatably connected to the device value collecting unit 2 and the abnormal state storage unit 3. This device feature information detecting unit 7 detects the feature of a normal state of the device value of the PLC as feature information from the device values of the monitored PLC collected by the device value collecting unit 2. Concretely, the device feature information detecting unit 7 detects the features of the maximum value, minimum value, period and changing rate of the device values.

Further, abnormal state editing unit 8 is communicatably connected to the device feature information detecting unit 7 and the abnormal state storage unit 3. This abnormal state editing unit 8 defines a new abnormal state and also resets the threshold value already set within the abnormal state storage unit 3, thereby storing a new threshold value or new condition by which the abnormal state of the PLC set for monitoring is decided.

Further, if the device value of the monitored PLC collected by the device value collecting unit 2 exceeds the threshold value stored in the abnormal state storage unit 3 or agrees with the condition stored therein, the abnormal state confirming unit 4 decides that this value exhibits abnormality, and supplies the device value or feature information of the data collected from the PLC in the abnormal state to a host computer such as a production managing server through LAN.

Figure 2:
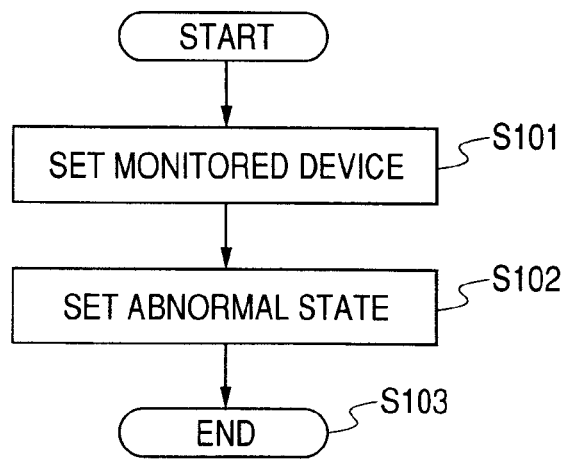
FIG. 2 is a flowchart of setting the abnormal state before the data collecting apparatus according to the first embodiment of this invention is operated.

An explanation will be given of setting of the abnormal state before the data collecting apparatus 1 is operated. FIG. 2 is a flowchart of setting the abnormal state before the data collecting apparatus according to the first embodiment of this invention is operated.

First, as described in S101, by a monitored device setting unit 6, a selected monitored PLC is set as a device to be monitored. Next, as described in S102, by the abnormal state setting unit 5, the threshold value or condition by which it is decided that the device value of the monitored device exhibits the abnormal state. Finally, as described in S103, the setting of the abnormal state is stored in the abnormal state storage unit 3, thereby completing the setting of the abnormal state before the data collecting apparatus 1 is operated.

Figure 3:
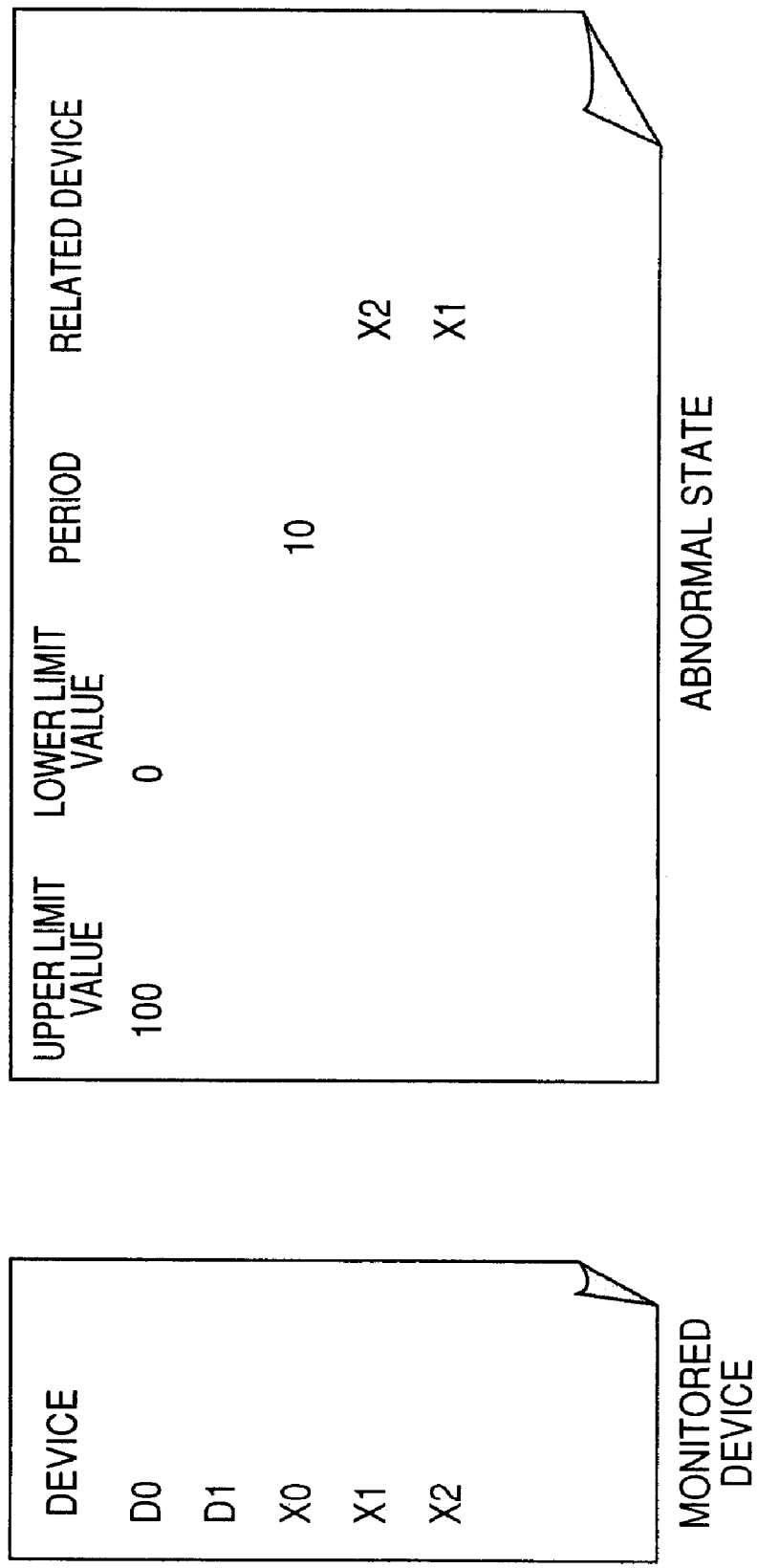
FIG. 3 is a view showing the abnormal state set before the data collecting apparatus according to the first embodiment of this invention is operated.

FIG. 3 is a view showing the abnormal state set before the data collecting apparatus according to the first embodiment of this invention is operated. In the column on the left side, it is shown that the devices to be monitored are D0, D1, X0, X1 and X2. In the column on the right side, the threshold value or condition of the abnormal state set is shown. On the uppermost step in the right column, items of the threshold value or condition such as an upper limit, a lower limit, a period and a relative device are arranged horizontally. According to the vertical position on the left side column where the device names are described and to the horizontal position of the item of the threshold value or condition on the right side column, the concrete contents of the threshold value or condition in the device are described. Further, the items where no value is entered in the abnormal state, e.g. the upper limit value, lower limit value, period, relative device of device D1 are non-specified items in the abnormal state.

Figure 4:
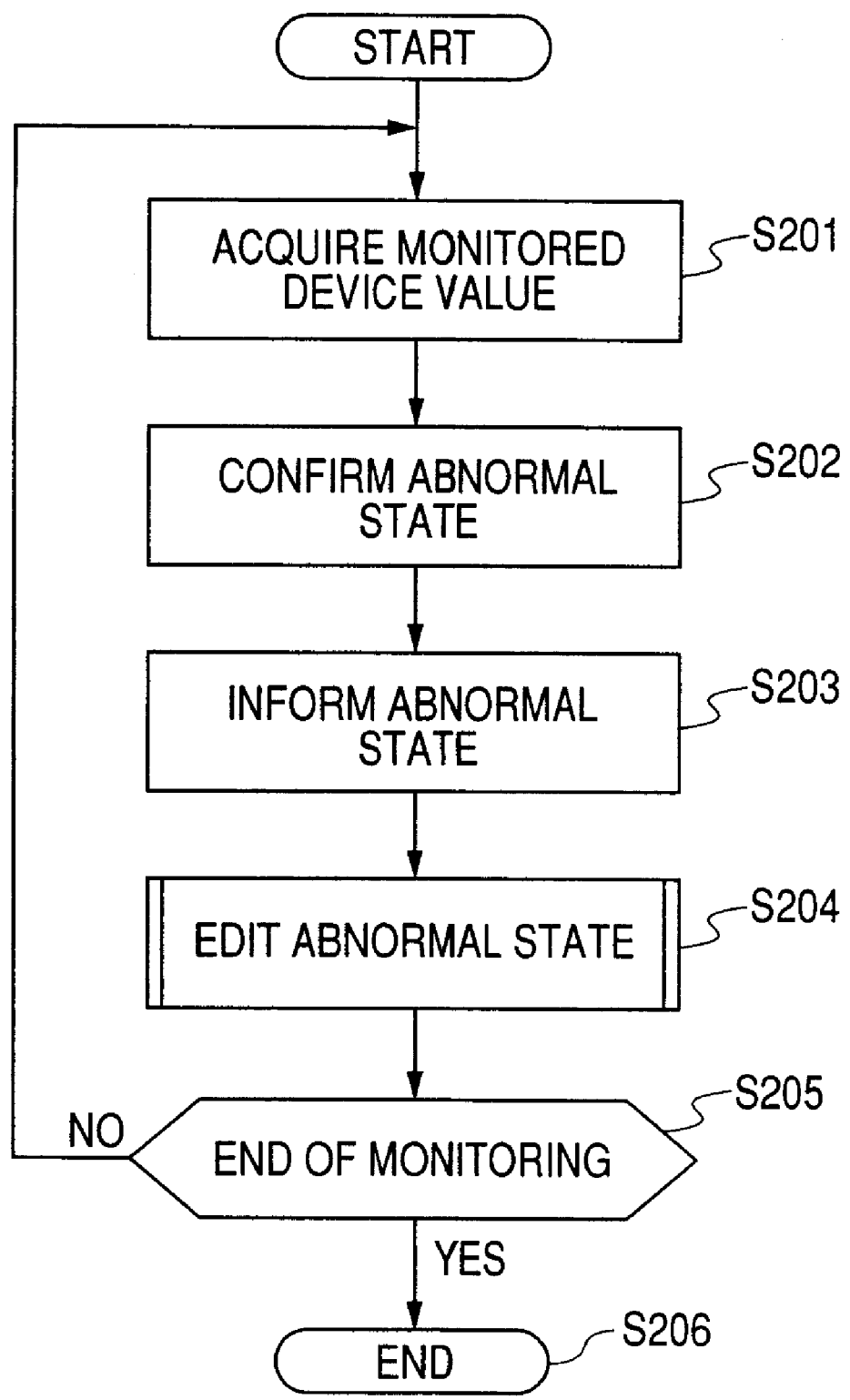
FIG. 4 is a flowchart showing the operation of the data collecting apparatus according to the first embodiment of this invention.

Next, an explanation will be given of the operation of the data collecting apparatus 1. FIG. 4 is a flowchart showing the operation of the data collecting apparatus according to the first embodiment of this invention.

First, in S201, the device value collecting unit 2 acquires the device value of the monitored device such as the PLC or other plants. Next, in S202, the abnormal state confirming unit 4 acquires the condition of the abnormal state stored in the abnormal state storage unit 3 and the device value of the monitored device acquired by the device value collecting unit 2 and compares them with each other. In S203, if the device value agrees with the condition of the abnormal state, the abnormal state confirming unit 4 informs, through LAN, the host computer such as a production managing server of that the monitored device is in the abnormal state and sends the device value and feature information to the host computer. If the monitored device is not in the abnormal state, no operation is executed or only the device value is produced.

Thereafter, in S204, the device feature information detecting unit 7 and the abnormal state editing unit 8 execute abnormal state editing processing. The abnormal state editing processing will be described later. Next, in S205, it is confirmed whether or not the monitoring should be ended. If the monitoring is continued, the above processing is repeated. If not, the processing is completed.

Figure 5:
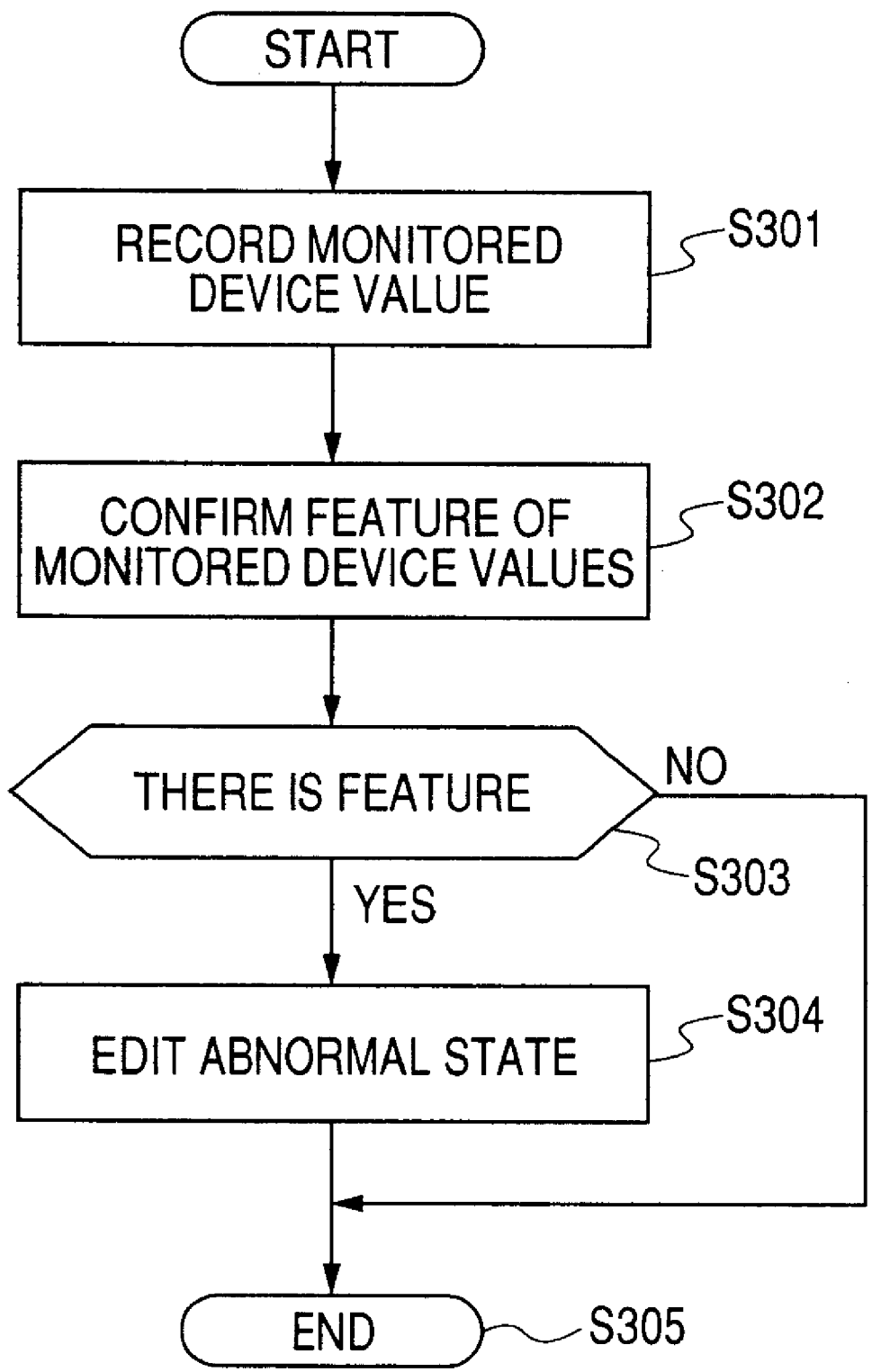
FIG. 5 is a flowchart showing the operation of abnormal state editing processing executed by device feature information detecting unit 7 and abnormal state editing unit 8 in the data collecting apparatus according to the first embodiment of this invention.

Next, an explanation will be given of the abnormal state editing processing. FIG. 5 is a flowchart showing the operation of abnormal state editing processing executed by device feature information detecting unit 7 and abnormal state editing unit 8 of the data collecting apparatus according to the first embodiment of this invention.

Figure 6:
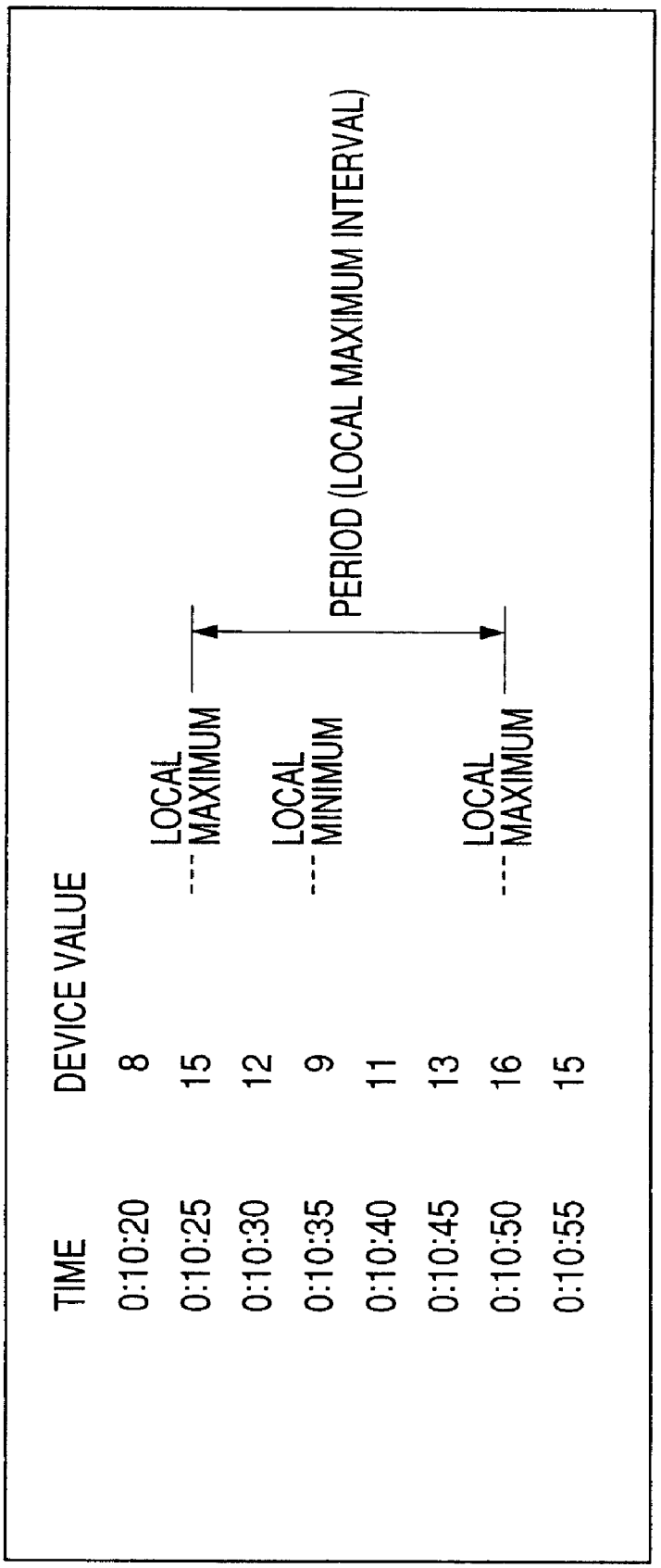
FIG. 6 is a table showing the values of a device D1 collected by device value editing unit 2 of the data collecting apparatus according to the first embodiment of this invention.

First, in S301, the device feature information detecting unit 7 records the device values of the monitored device collected by the device value collecting unit 2. The explanation will be given of the case of device name D1 in FIG. 3. FIG. 6 is a view showing the device values of device name D1 collected by device value editing unit 2 of the data collecting apparatus according to the first embodiment of this invention.

In FIG. 6, the left column describes times and the right column describes the device values corresponding to the times on the left side. The time on the left column 0:10:20 represents zero (hour) ten (minutes) twenty (seconds).

Next, in S302 in FIG. 5, the device feature information detecting unit 7 confirms whether or not the device values of the device name D1 arranged in time sequence have features. Concretely, it is confirmed for a predetermined time whether or not the device values of the device name D1 have exhibited the features such as local maximum value, local minimum value, maximum value and minimum value. In FIG. 6, at 0:10:25, the local maximum value of 15 appears; at 0:10:35, the device value becomes small; and at 0:10:50, the next local maximum value of 16 appears. In this case, the predetermined time is 25 seconds. The length of this predetermined time can be adjusted according to various using conditions.

Thus, in S303 in FIG. 5, the device feature information detecting unit 7 determines that there is the feature that the appearing period of the local maximum value is 25 seconds.

Figure 7:
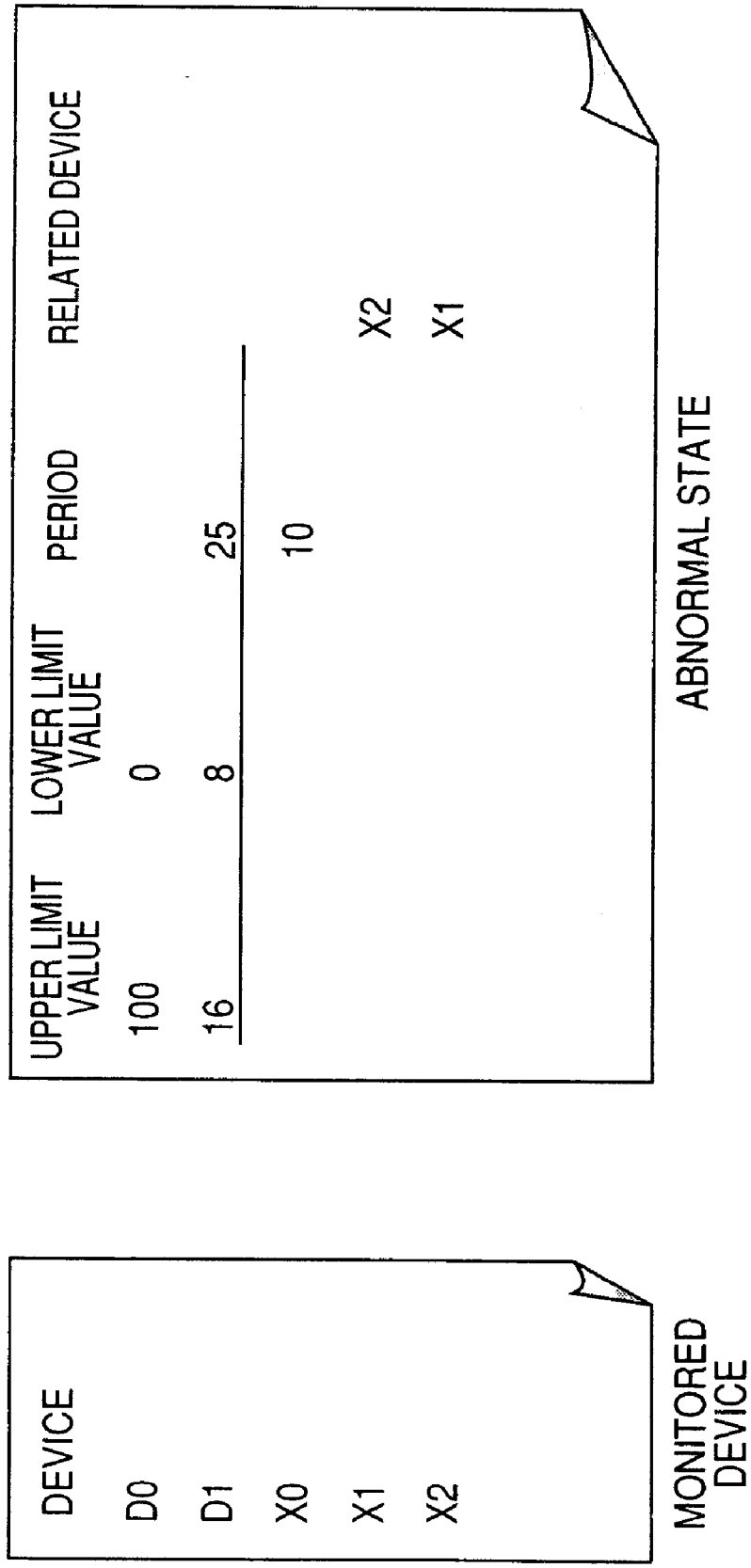
FIG. 7 is a table showing the abnormal state edited by the abnormal state editing unit 8 for FIG. 3 in the operation of the data collecting apparatus according to the first embodiment of this invention.

If it is determined in S303 in FIG. 5 that there is no feature, in S305, the processing is ended. If it is determined that there is the feature, in S304, as the abnormal state editing processing, the abnormal state editing unit 8 edits the threshold value or condition for making a decision of the abnormal state stored in the abnormal state storage unit 3. FIG. 7 is a view showing the abnormal state edited by the abnormal state editing unit 8 for FIG. 3 in the operation of the data collecting apparatus according to the first embodiment of this invention.

In contrast to the view of FIG. 3 showing the abnormal state, in FIG. 7, the abnormal state editing unit 8 adds the portion underlined. Thus, for device name D1, if the device value is larger than the maximum value of 16, if the device value is smaller than the maximum value of 8, and if the device values give the period other than 25 seconds, determination of abnormality may be made. Of course, the processing can be performed in which 17.6 or more with a margin of 10% of the local maximum value of 16 exhibits the abnormality, and for example, 12.5 seconds or less, half as long as the period of 25 seconds and 50 seconds or more twice as long as the period exhibit the abnormality. Further, the abnormal state can be edited by not only setting the non-set threshold value but also changing the threshold value already set.

Figure 8:
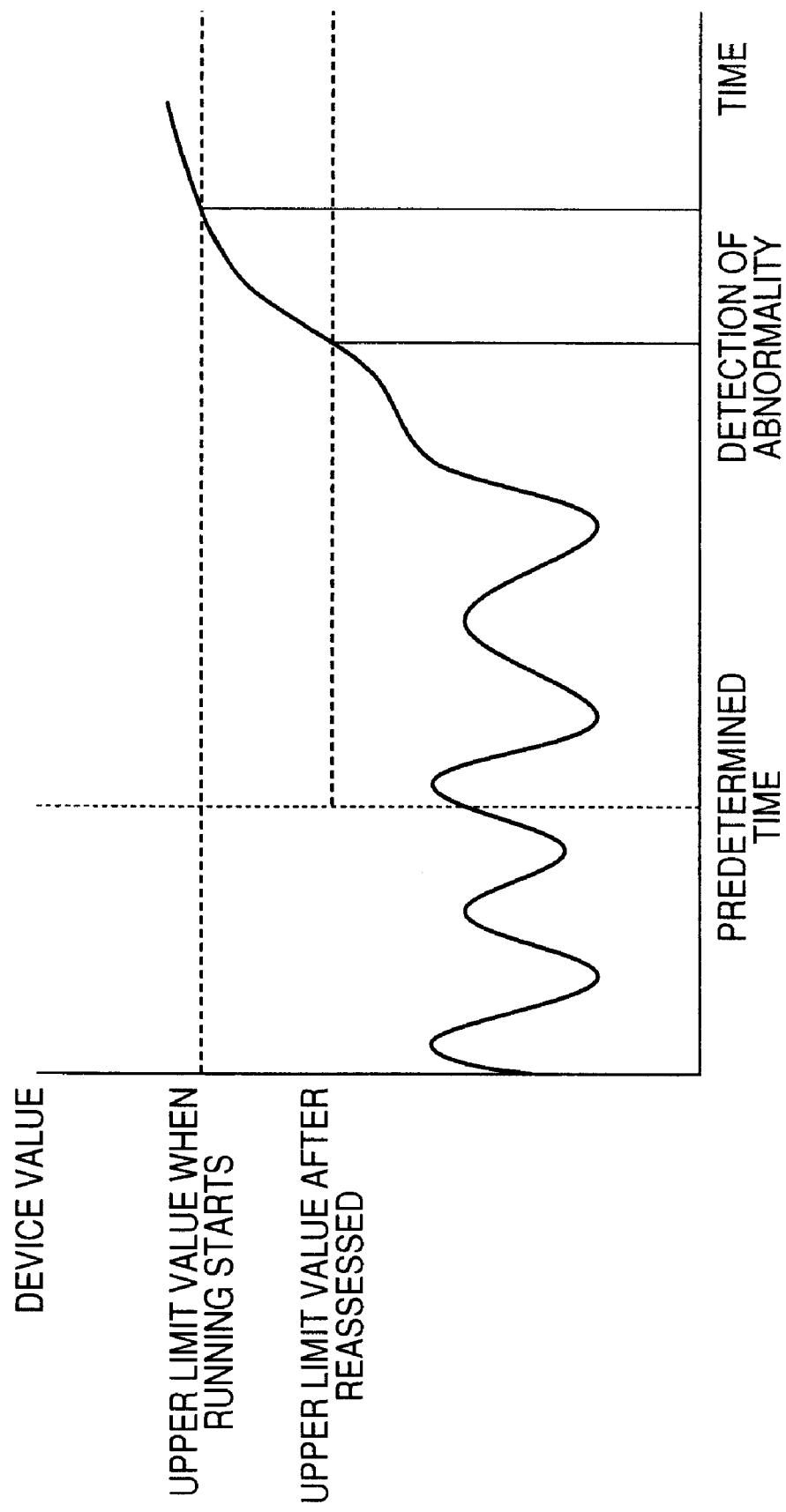
FIG. 8 is a graph showing the relationship between a time and the threshold value of the upper limit in a variation of the device value in the data collecting apparatus according to the first embodiment of this invention.

FIG. 8 is a graph showing the relationship between a time and the threshold value of the upper limit in a variation of the device value in the data collecting apparatus according to the first embodiment of this invention. The horizontal axis represents time and the vertical axis represents the device value. Solid line indicates the device value relative to time. Upper dotted line indicates the threshold value of the upper limit value in the prior art and lower dotted line indicates the threshold value of the upper limit value in the first embodiment.

In the case of the prior art, since body differences among products and the device values during the trial operation are used for reference, a redundant margin must be computed and adopted. On the other hand, in accordance with the first embodiment, for individual products, the margin adapted to the value during the real operation can be set. The step of computing the margin can be avoided, and the margin can be reduced. Thus, the detection of abnormality can be done in a earlier stage.

Figure 9:
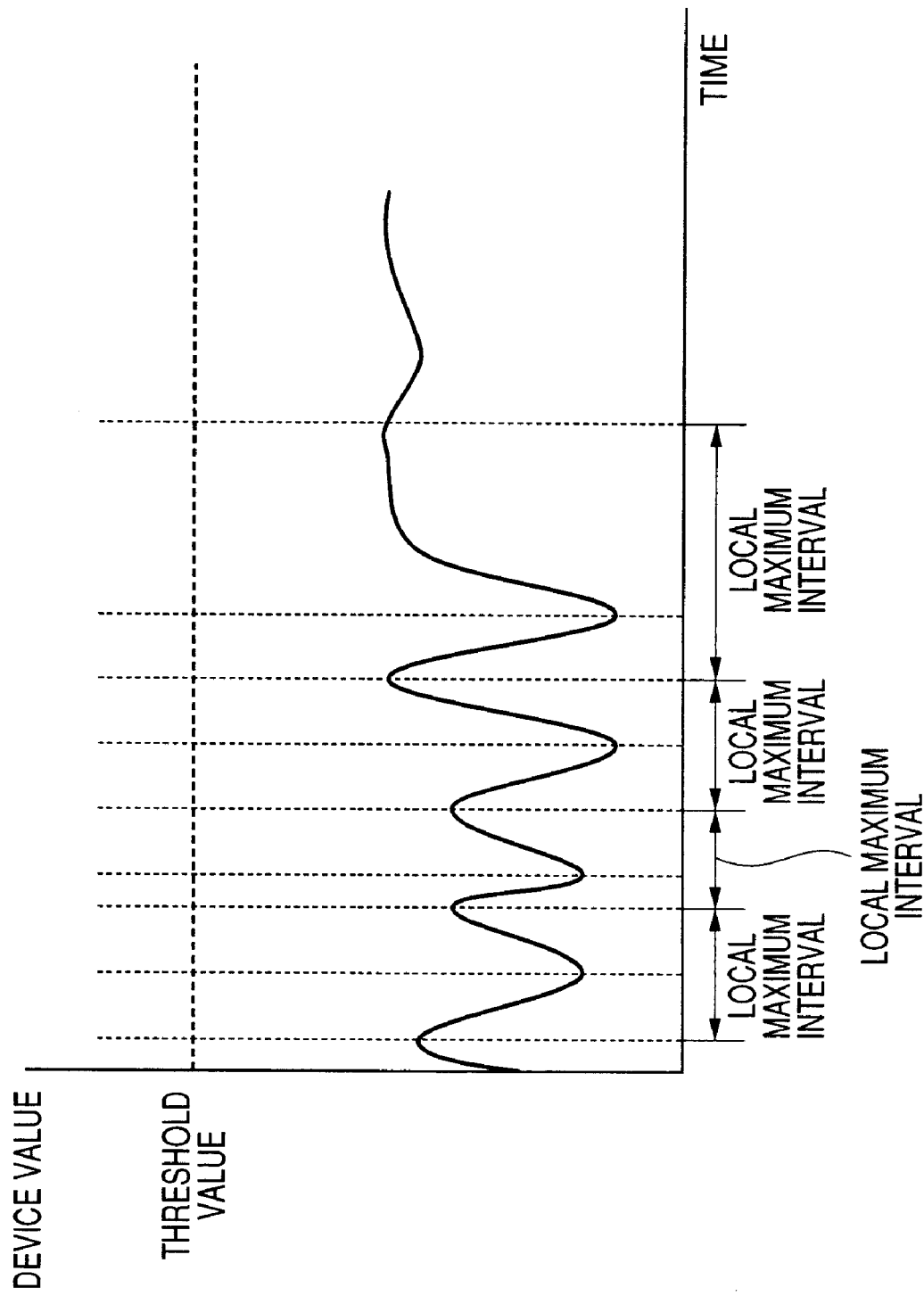
FIG. 9 is a view showing the relationship between a time and the condition of a period in a variation of the device value in the data collecting apparatus according to the first embodiment of this invention.

FIG. 9 is a view showing the relationship between a time and the condition of a period in a variation of the device value in the data collecting apparatus according to the first embodiment of this invention. The horizontal axis represents a time and the vertical axis represents a device value. The solid line indicates the device value relative to a time and thin dotted line in the vertical axis indicates the time when the device is local maximum or local minimum.

The period is detected as the feature information for individual products. In FIG. 9, in the changing process of the device value from the local minimum value to the local maximum value, a period is about three times as long as that in an ordinary case, therefore, it is possible to detect that the product is abnormal.

Since the data collecting apparatus includes device value collecting unit 2 for collecting device values from a plurality of devices, abnormal state storage unit 3 for storing a monitored device to be monitored and the threshold value or condition by which it is determined that the monitored device is abnormal, abnormal state confirming unit 4 for comparing the device values of the plurality of devices with the threshold value or condition by which it is determined that the device is abnormal, determining whether or not the device is abnormal and if abnormal, sending the information that the device is abnormal to a host managing device, device feature information detecting unit 7 for detecting the feature information from device values collected by the device value collecting unit 2 and abnormal state editing unit 8 for editing the threshold value or condition by which it is determined that the monitored device is abnormal, stored in the abnormal state storage unit 3, using the feature information detected. For this reason, the labor of setting the threshold value or condition used for the real running point can be reduced to shorten the time taken to boot the device, the number of cases where the threshold value or condition is erroneously set can be reduced and the threshold value or condition can be set within a narrow range.

It is possible to detect the abnormality from the device feature unknown at the timing when the monitored device is operated, thereby reducing the overlooking of the abnormal state. Further, the set abnormal state can be set according to the operating state, thus facilitating discrimination between the normal state and the abnormal state.

Incidentally, the transition in the device value stored in the abnormal state editing unit 8 as shown in FIG. 6 can be stored in a simplified manner.

Figures 10, 11:
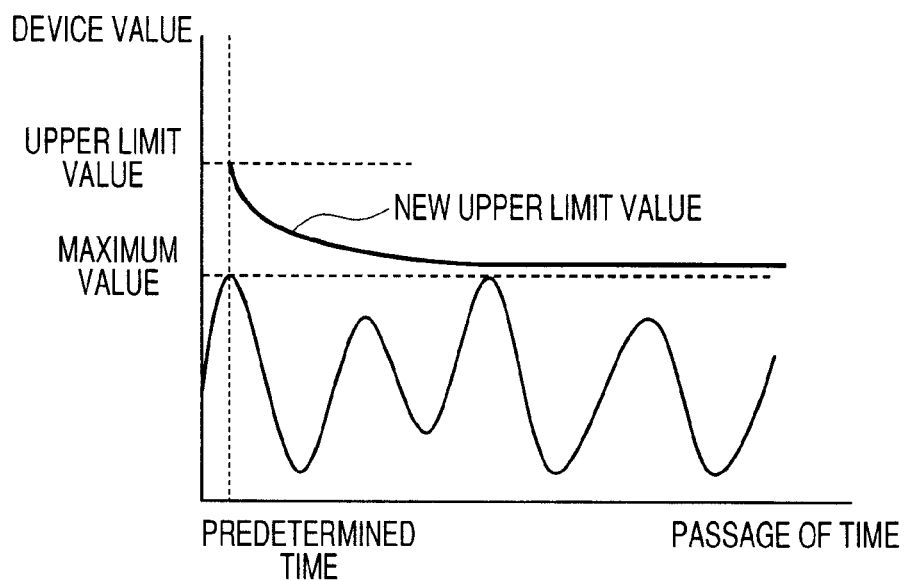
FIG. 10 is a view showing the transition of a device value stored in a device feature information detecting unit 7, simplified for FIG. 7.
FIG. 11 is a graph showing a new upper limit computed by Equation (1) in the operation of the data collecting apparatus according to the second embodiment of this invention.

FIG. 10 is a view showing the transition of a device value stored in a device feature information detecting unit 7, simplified for FIG. 7. As shown in FIG. 10, by the device information detecting unit 7, only the device feature information can be stored on the basis of the transition of the device value.

Thus, all the device values at individual times may not be stored and the feature information can be taken out instantaneously. Therefore, the storage memory may be small and the burden on detection of the feature information can be reduced.

Embodiment 2

In the first embodiment, it was not particularly described that the threshold value or condition set by the abnormal state editing unit 8 varies with time. However, in the second embodiment, an explanation will be given of the case where the threshold value or condition set by the abnormal state editing unit 8 is a function of time. As long as not particularly expressed, the same manner as in the first embodiment will be adopted.

If the device value of the monitored device such as PLC does not exceed the maximum value for a predetermined time, it is estimated that this expresses the normal state. It is estimated that as long as the monitored device is normal, the device value does not largely exceed the maximum value in a longer elapsed time. In other words, by gradually bringing the threshold value or upper limit value for making a diagnosis of abnormality near to the maximum value with the passage of time, the abnormal state can be detected more quickly.

Thus, in order to detect the abnormal state more quickly, assuming that the time passed after the predetermined time taken for the device feature information detecting unit 7 to acquire the feature information in the first embodiment is t, a new upper limit value can be set as expressed by Equation (1).

[Equation 1]

New upper limit value=upper limit value×$(1/e^t)$+maximum value×$(1-1/e^t)$ where e=2.71828182845904 (bottom of natural logarithm) (1)

FIG. 11 is a graph showing a new upper limit computed by Equation (1) in the operation of the data collecting apparatus according to the second embodiment of this invention. The horizontal axis represents passed time and the vertical axis represents the device value of a certain monitored device. Where the device name of the monitored device in the first embodiment is D1, if the upper limit takes a margin of 10% for the maximum value into consideration, in Equation (1), the upper limit value of 17.6 and the maximum value of 16 may be substituted into Equation (1).

The upper limit value is set so that it gradually becomes the maximum value when the passed time is infinitely large in the time function using the natural logarithm. For this reason, in addition to the advantage described in the first embodiment, by gradually bringing the threshold value or upper limit value making a diagnosis of abnormality near to the maximum value, the threshold value of condition can be set in a smaller range according to the passed time, thereby permitting the abnormal state to be detected more quickly.

In this embodiment, although only the upper limit value has been expressed in the equation, likewise, regarding the lower limit value, its new lower limit value can be set using the equation (new lower limit value=lower limit value×$(1/e^t)$+minimum value×$(1-1/e^t)$).

Further, regarding the period also, by setting the upper limit value and lower limit value with a margin of e.g. 10% for the maximum value and minimum value stored on the basis of the variation, Equation (1) or the above lower limit value can be applied to the period.

Embodiment 3

In the third embodiment, an explanation will be given of another example in the case where the upper limit value is a time function. As long as not particularly expressed, the same manner as in the first embodiment will be adopted.

Since Equation (1) in the second embodiment necessitates an exponent computation, it lengthens the time required for computing processing of a computer such as the exponent computation. Further, the data collecting apparatus 1 for monitoring the PLC and others is not only designed to have a computation processing capability at a required minimum limit, but also preferentially collects the device values. This lengthens the computation processing time. Thus, the time taken for an editing operation for the abnormal state is lengthened. This leads to a possibility of retarding the timing of monitoring a subsequent abnormal state.

Thus, in the third embodiment, in order that a new upper limit value is expressed as a linear function, the new upper limit value is set by Equation (2)

[Equation 2]

New upper limit value=upper limit value×$(1-t/t_0)$+ maximum value×$(t/t_0)$ $(0 \leq t \leq t_0)$ New upper limit value=maximum value $(t_0 < t)$ (2)

Figure 12:
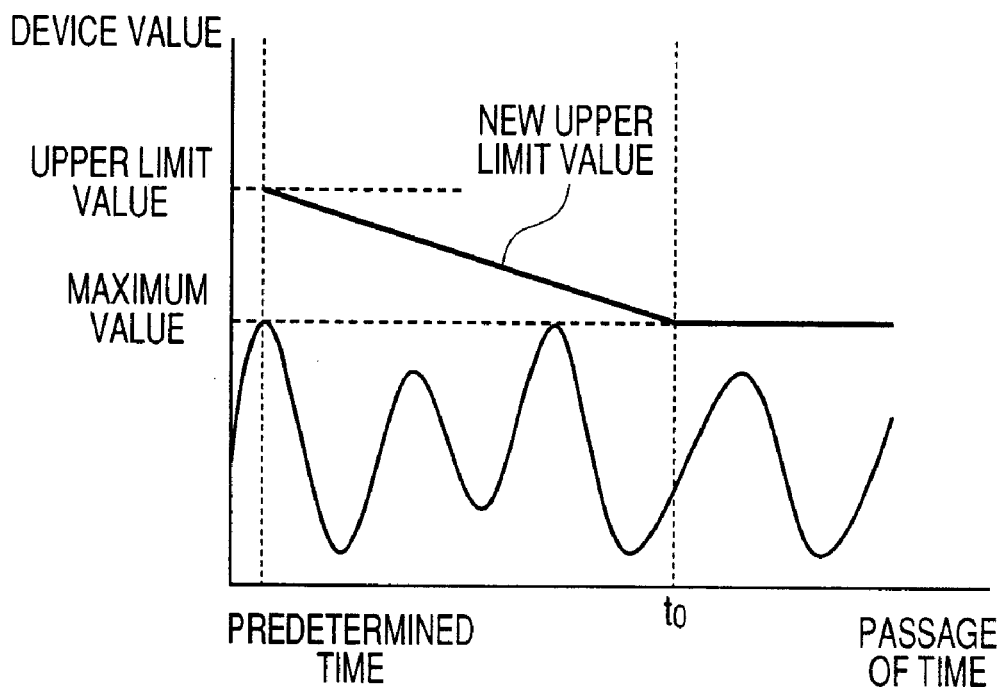
FIG. 12 is a view showing a new upper limit value computed by Equation (2) in the operation of the data collecting apparatus according to the third embodiment of this invention.

The upper limit value and maximum value are the same as in the second embodiment, and $t_0$ can be appropriately set according to each PLC. FIG. 12 is a view showing a new upper limit value computed by Equation (2) in the operation of the data collecting apparatus according to the third embodiment of this invention. The horizontal axis represents passed time and the vertical axis represents the device value of a certain monitored device.

In Equation (2), when a predetermined time to passes, if the device value exceeds the previous maximum value, determination of abnormality is made. Where the device value has a possibility exceeding the previous maximum value, even if the device is in the normal state, determination of abnormality is made. So, the upper limit value is set with a slight margin for the maximum value so that the normal state is not determined as abnormality. The computing expression considering this is given as Equation (3).

[Equation 3]

New upper limit value=upper limit value×$(1-t/t_0)$+ maximum value×$(t/t_0)$ $(0 \leq t \leq a \times t_0)$ New upper limit=upper limit×$(1-a)$+maximum value×$a$ $(a \times t_0 \leq t)$ (3)

In this equation, $a$ is $0 < a < 1$, but is the value giving a slight margin for the maximum value so that $a$ is the value near 1, e.g. 0.8 or so.

Figure 13:
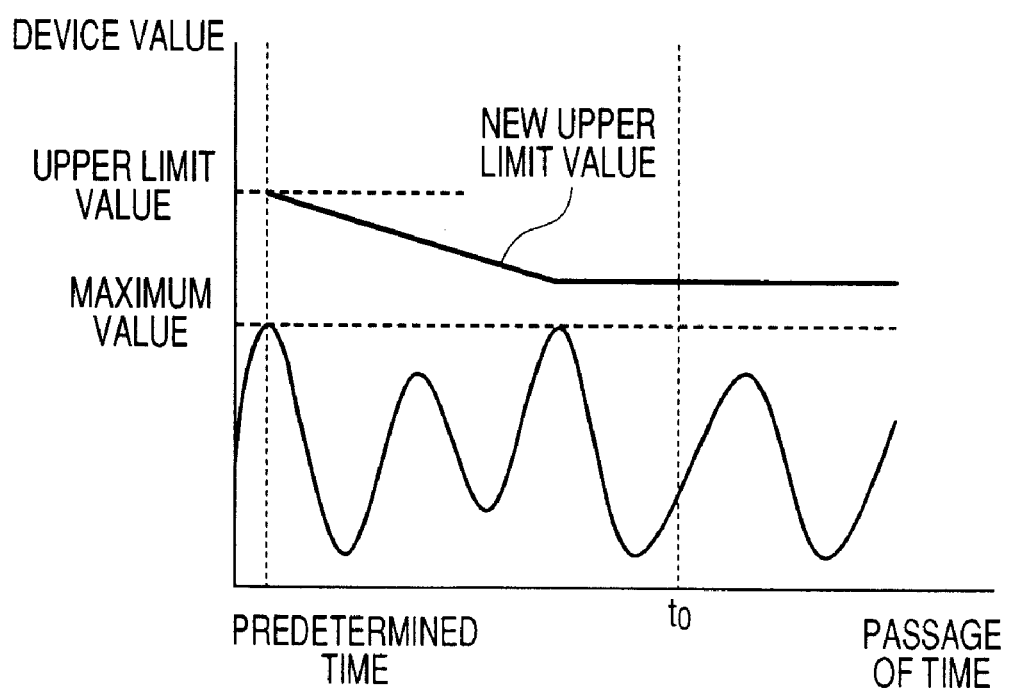
FIG. 13 is a view showing a new upper limit value computed by Equation (3) in the operation of the data collecting apparatus according to the third embodiment of this invention.

FIG. 13 is a view showing a new upper limit value computed by Equation (3) in the operation of the data collecting apparatus according to the third embodiment of this invention. The horizontal axis represents passed time and the vertical axis represents the device value of a certain monitored PLC.

In this way, the upper limit value gradually becomes the maximum value or for the value with a slight margin for the maximum value with a passed time in a linear time function. Thus, in addition to the advantage described in the first embodiment, gradually bringing the threshold value making a diagnosis of abnormality or upper limit value near to the maximum value, the abnormal state can be detected more quickly.

In this embodiment, only the upper limit value has been expressed in the equation. However, likewise, in Equation (2) and Equation (3), by substituting the new lower limit value for the new upper limit value, the lower limit value for the upper limit value and the minimum value for the maximum value, these equations can be also applied to the lower limit value.

Further, regarding the period also, by setting the upper limit value and lower limit value with a margin of e.g. 10% from the maximum value and minimum value stored on the basis of the variation, Equation (2) or Equation (3) or the above lower limit value can be applied to the period.

Embodiment 4

In the first to third embodiments, the explanation has been given of the case where the threshold value or condition set by the abnormal state editing unit 8 is a fixed value or the time function. In this embodiment, an explanation will be given of the case where it is the other variable. As long as not particularly expressed, the same manner as in the first embodiment will be adopted.

In the fourth embodiment, it is assumed that the device names of a monitored device A and a monitored device B are set as the PLCs monitored by the data collecting apparatus 1. In the normal using state of the real running, if the device value of the monitored device A is smaller than the device value of the monitored device B, as the condition of the abnormal state of the monitored device B, in place of the upper limit value, it is set that the device value of the monitored device is larger that that of the monitored device A.

Figure 14:
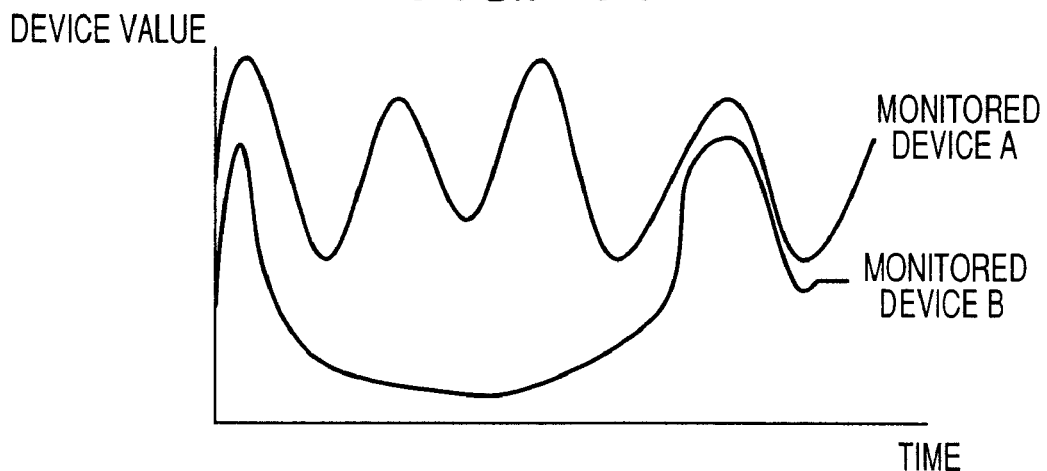
FIG. 14 is a graph showing a new upper limit value of a monitored device B taken as a device value of a monitored A in the operation of the data collecting apparatus according to the fourth embodiment of this invention.

FIG. 14 is a graph showing a new upper limit value of a monitored device B taken as a device value of a monitored A in the operation of the data collecting apparatus according to the fourth embodiment of this invention. Such setting can be made in such as manner that the device value feature information detecting unit 7 detects the feature of the stored device value of the monitored device A collected from the device value collecting unit 2 as the upper limit value of the device value of the monitored device B.

Thus, regardless of the movement of the two device values, by recognizing the feature that the one device invariably has a device value larger than that of the other device, in addition to the advantage obtained by the first embodiment, if the device values are inverted, determination of abnormality can be made. This provides the advantage of reducing the overlooking of the abnormal state.

Embodiment 5

In the fifth embodiment, an explanation will be given of the other embodiment of the threshold value or condition set by the abnormal state editing unit 8.

There is a case where monitored devices of the device names X0 and X1 which are monitored PLCs produce only two values of ON and OFF, respectively, and in the real running, although the device value itself of each device will not be determined at all that it is abnormal, if the real running is normal, the logical sum of the devices X0 and X1 will not become 0, and if becomes 0, determination of abnormality can be made. Further, there is a case where determination of abnormality is made in combination of the logical sum and logical product.

Figure 15:
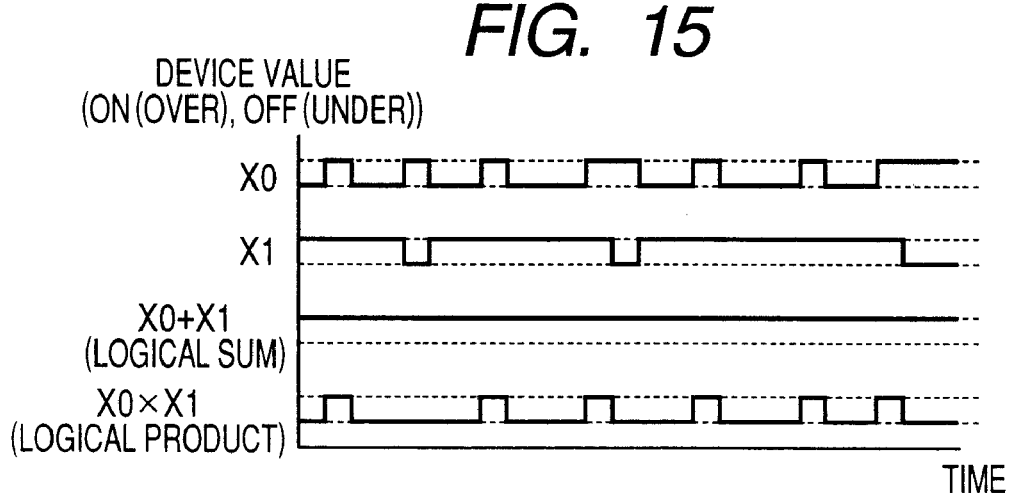
FIG. 15 is a view showing the device values of a device X0 and a device X1 and the logical sum and logical product therebetween in the operation of the data collecting apparatus according to the fifth embodiment of this invention.

FIG. 15 is a view showing the device values of a device X0 and a device X1 and the logical sum and logical product therebetween in the operation of the data collecting apparatus according to the fifth embodiment of this invention.

The uppermost item denotes the device value of X0, the next item denotes the device value of X1, the second item from the bottom denotes the logical sum of the device value of X0 and the device value of X1, and the lowermost item denotes the logical product of the device value of X0 and the device value of X1. The device feature information detecting unit 7 detects the feature that if the real running is normal, the logical sum of the devices X0 and X1 will not become 0, and if becomes 0, determination of abnormality is made. Thus, the condition of the abnormal state in the abnormal state editing unit 8 can be set by the logical sum, logical product or combination thereof in the device values in the two devices X0 and X1.

Accordingly, by detecting the device feature information on the logical operation result such as the logical sum and logical product of the two device values having two values of ON or OFF, in addition to the advantage according to the first embodiment, where the logical sum is necessarily ON, determination of abnormality can be made by the case of OFF and in combination of the logical sum and logical product.

Embodiment 6

In the sixth embodiment, an explanation will be given of the other embodiment of the threshold value or condition set by the abnormal state editing unit 8. As long as not particularly expressed, the same manner as in the first embodiment will be adopted.

There is a case where the tank A and tank B which are a kind of the device such as the monitored PLC exhibit device values in different senses, but the quantities of a liquid to be dividedly stored in the tank A and tank B must be managed. In this case, the device feature information detecting unit 7 for detecting the lower limit value detects, as the feature information, that the total value of the device value of the capacity of the tank A and the device value of the capacity of the tank B does not become lower than the minimum value, thereby setting it as the condition of the abnormal state in the abnormal state editing unit 8.

Figure 16:
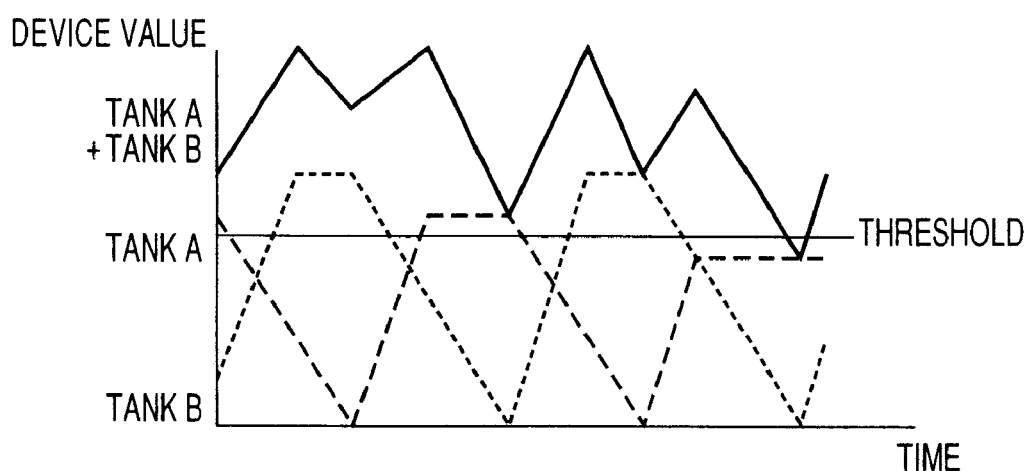
FIG. 16 is a view showing the device values of a tank A and a tank B, the sum therebetween and the lower limit value of the sum in the operation of the data collecting apparatus according to the sixth embodiment of this invention.

FIG. 16 is view showing the device values of a tank A and a tank B, the sum therebetween and the lower limit value of the sum in the operation of the data collecting apparatus according to the sixth embodiment of this invention.

The horizontal axis indicates time and the vertical axis indicates a device value. Coarse broken line indicates the device value of tank A; fine broken line indicates the device value of tank B; bold solid line indicates the sum of the device value of tank A and the device value of tank B; and slender solid line indicates the threshold value of the lower limit value. In accordance with FIG. 16, abnormality can be detected by the fact that the sum of the device value of tank A and the device value of tank B has become lower than the lower limit value.

Thus, the overlooking of the abnormal state can be reduced.

Embodiment 7

There is a case where because the managing device which is a host production managing server connected to the data collecting apparatus 1 and a descendent PLC connected thereto are different in their language and communication specification, even if the data are collected as the device value of the PLC to transfer the data or the information indicative of the abnormal state to a host managing device, the data must be converted in the language or communication specification conformed to the managing device serving as the host production managing server.

So, a gateway apparatus is constructed to include the data collecting apparatus 1 according the first to sixth embodiments and a converter for converting the data collected by the data collecting apparatus into the application, language or communication specification conformed to the host production managing server, thereby converting the information from the host production managing server into the application, language or communication specification conformed to the device such as a descendent PLC. Thus, the gateway apparatus capable of giving the advantage according to the first to sixth embodiment can be provided.

INDUSTRIAL APPLICABILITY

The data collecting apparatus and gateway apparatus according to this invention is suitable to detection of abnormality of the device such as PLC applied in a production line.

The invention claimed is:

1. A data collecting apparatus comprising:
device value collecting unit for collecting device values from a plurality of devices;
abnormal state storage unit for storing a monitored device to be monitored and a threshold value or condition by which it is determined that the monitored device is abnormal;
abnormal state confirming unit for comparing the device values of the plurality of devices with the threshold value or condition by which it is determined that the monitored device is abnormal, determining whether or not the monitored device is abnormal and if abnormal, sending the information that the device is abnormal to a host managing device;
device feature information detecting unit for detecting feature information from device values collected by the device value collecting unit; and
abnormal state editing unit for editing the threshold value or condition by which it is determined that the monitored device is abnormal, stored in the abnormal state storage unit, using the feature information detected, wherein
the threshold value or condition is based on a time function in which a permissible range of said device value is narrowed with the passage of time,
wherein the feature information detecting unit detects at least one of maximum value, minimum value, local maximum value, and local minimum value and detects an occurred time of the at least one of the maximum value, minimum value, local maximum value, and local minimum value as the feature information, and
wherein the permissible range is consistently equal to or narrower than just before the permissible range.

2. A data collecting apparatus according to claim 1, wherein the feature information contains a period of a transition of the device value relative to passed time of said monitored device.

3. A data collecting apparatus according to claim 1, wherein the threshold value or condition is set on the basis of the device value of another monitored device.

4. A data collecting apparatus according to claim 1, wherein the feature information contains the computation result using the device values of the plurality of monitored devices, and said threshold value or condition is set on the basis of said computation result.

5. A gateway apparatus comprising a data collecting apparatus according to claim 1 and a converter for converting the information outputted from the data collecting apparatus into the application, language or communication specification conformed to a host production managing device, wherein the information inputted from the said production managing device at a higher rank is converted into the application, language or communication specification conformed to a device connected at a lower rank and outputted.

6. A data collecting apparatus comprising:
device value collecting unit for collecting device values from a plurality of devices;
abnormal state storage unit for storing a monitored device to be monitored and a threshold value or condition by which it is determined that the monitored device is abnormal;
abnormal state confirming unit for comparing the device values of the plurality of devices with the threshold value or condition by which it is determined that the monitored device is abnormal, determining whether or not the monitored device is abnormal and if abnormal, sending the information that the device is abnormal to a host managing device;
device feature information detecting unit for detecting feature information from device values collected by the device value collecting unit; and
abnormal state editing unit for editing the threshold value or condition by which it is determined that the monitored device is abnormal, stored in the abnormal state storage unit, using the feature information detected,
wherein the threshold value or condition is set on the basis of the device value of the another monitored device, and
the threshold value or condition is based on a time function in which a permissible range of said device value is narrowed with the passage of time, wherein when a comparison result of comparing a first device value of the monitored device to a second device value of another monitored device, indicates that the first device value and the second device value are inverted, an abnormality is determined.

7. A data collecting apparatus comprising:
device value collecting unit for collecting device values from at least two of a plurality of devices;
abnormal state storage unit for storing a monitored device to be monitored and a threshold value or condition by which it is determined that the monitored device is abnormal;
abnormal state confirming unit for comparing the device values of the at least two of the plurality of devices with the threshold value or condition by which it is determined that the monitored device is abnormal, determining whether or not the monitored device is abnormal and if abnormal, sending the information that the device is abnormal to a host managing device;

device feature information detecting unit for detecting feature information from device values collected by the device value collecting unit; and abnormal state editing unit for editing the threshold value or condition by which it is determined that the monitored device is abnormal, stored in the abnormal state storage unit, using the feature information detected, wherein the monitored device and another monitored device each only produce ON and OFF device values, and wherein the threshold value or condition is set based on at least one of a logical sum and logical product of the respective ON and OFF values of the monitored device and said another monitored device.

* * * * *

UNITED STATES PATENT AND TRADEMARK OFFICE
CERTIFICATE OF CORRECTION

PATENT NO. : 7,877,634 B2
APPLICATION NO. : 11/912231
DATED : January 25, 2011
INVENTOR(S) : Seiichi Kawano It is certified that error appears in the above-identified patent and that said Letters Patent is hereby corrected as shown below:

*Column 7:*

[Equation 1] should read

New upper limit value = upper limit value * $(1/e^t)$ + maximum value * $(1 - 1/e^t)$ where e = 2.71828182845904 (bottom of natural logarithm)

*Column 8:*

[Equation 2] should read

New upper limit value = upper limit value * $(1-t/t_0)$ + maximum value * $(t/t_0)$ $(0 \leq t \leq t_0)$ New upper limit value = maximum value $(t_0 < t)$

[Equation 3] should read

New upper limit value = upper limit value * $(1-t/t_0)$ + maximum value * $(t/t_0)$ $(0 \leq t \leq a*t_0)$ New upper limit value = upper limit value * $(1-a)$ + maximum value * a $(a*t_0 < t)$ Signed and Sealed this
Twelfth Day of February, 2013

Teresa Stanek Rea
*Acting Director of the United States Patent and Trademark Office*